United States Patent [19]

Kamimura et al.

[11] Patent Number: 5,031,101
[45] Date of Patent: Jul. 9, 1991

[54] POSITION-DETECTING AND STEERING CONTROL SYSTEM FOR MOVING VEHICLE

[75] Inventors: Kenji Kamimura; Sadachika Tsuzuki, both of Saitama, Japan

[73] Assignee: Honda Giken Kogyo Kabushiki Kaisha, Tokyo, Japan

[21] Appl. No.: 420,063

[22] Filed: Oct. 11, 1989

[30] Foreign Application Priority Data

Oct. 18, 1988 [JP] Japan .............................. 63-262192
Dec. 9, 1988 [JP] Japan .............................. 63-310053

[51] Int. Cl.$^5$ ............................................. G06F 15/50
[52] U.S. Cl. .............................. 364/424.02; 180/168; 356/1
[58] Field of Search .............. 364/424.02, 424.01, 364/443, 449; 318/568.12; 180/168; 356/1

[56] References Cited

U.S. PATENT DOCUMENTS

| | | | |
|---|---|---|---|
| 3,687,556 | 8/1972 | Price et al. ........................... | 356/152 |
| 4,119,900 | 10/1978 | Kremnitz ............................. | 318/587 |
| 4,305,077 | 12/1981 | Tsumura ........................... | 343/112 R |
| 4,309,758 | 1/1982 | Halsall et al. .................... | 364/424.02 |
| 4,328,545 | 5/1982 | Halsall et al. .................... | 364/424.02 |
| 4,710,020 | 12/1987 | Maddox et al. ........................ | 356/1 |
| 4,796,198 | 1/1989 | Boultinghouse et al. ........... | 364/513 |
| 4,858,132 | 8/1989 | Holmquist ...................... | 364/424.02 |
| 4,942,531 | 7/1990 | Hainsworth et al. .......... | 364/424.02 |

Primary Examiner—Thomas G. Black
Attorney, Agent, or Firm—Pollock, Vande Sande and Priddy

[57] ABSTRACT

A steering control system for a moving vehicle wherein a light beam emitted from the moving vehicle is scanned along the circumferential direction thereof, and the light beam reflected by light-reflecting means disposed at at least three reference points is received to detect a position of the moving vehicle comprising, an azimuth detection means for detecting azimuths of the respective light-reflecting means, a position calculation means for calculating the position of the moving vehicle based on the azimuths detected, and a means for stopping travel of the moving vehicle when a following beam signal has not been detected over a predetermined period of time after detecting a preceding beam signal from a particular light reflecting means. It may comprise an azimuth prediction means for predicting an azimuth of the light-reflecting means to be detected in the next scanning cycle and an azimuth presumption means for presuming the azimuth of the light-reflecting means which is not detected when the light-reflecting means is not detected in the predicted azimuth.

14 Claims, 15 Drawing Sheets

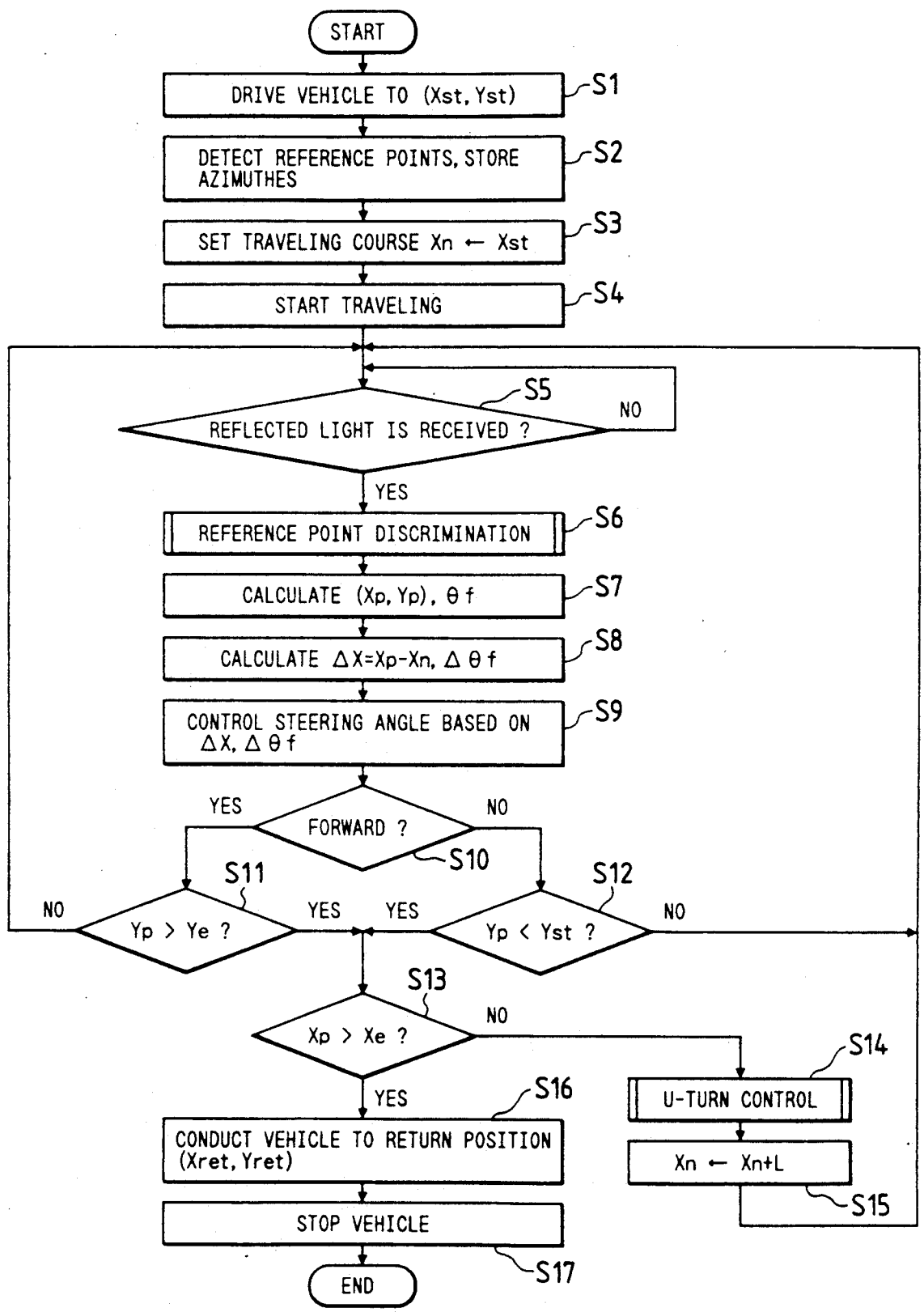

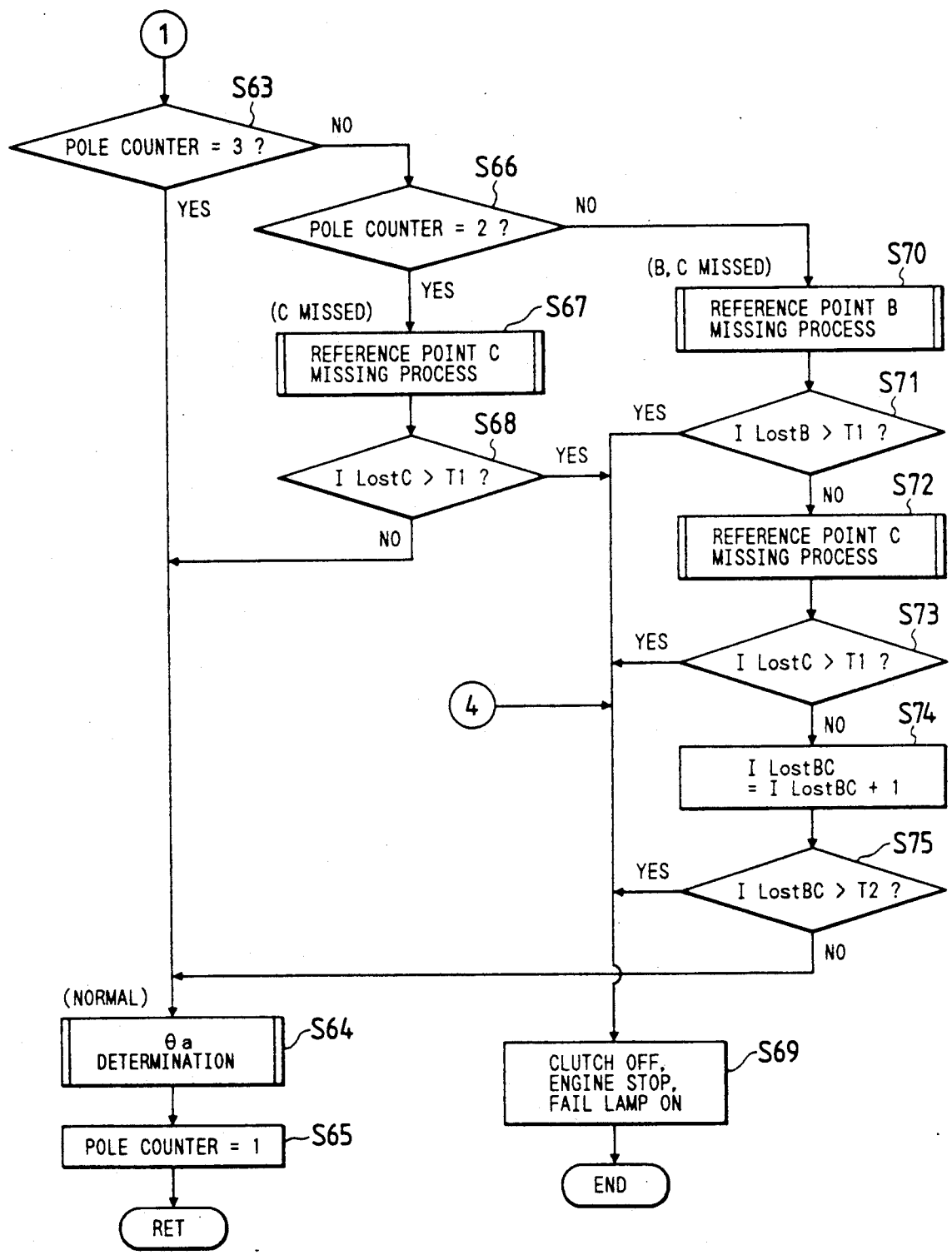

POSITION-DETECTING AND STEERING CONTROL SYSTEM FOR MOVING VEHICLE

BACKGROUND OF THE INVENTION

1. Field of the Invention

The present invention relates to a position-detecting and steering control system for use in a moving vehicle, and more particularly to a position-detecting and steering control system for use in a moving vehicle such as a moving automobile, an unmanned mobile and carrying device in a factory, or an automated vehicle for use in agriculture, civil engineering machinery and the like.

2. Description of the Prior Art

Heretofore, as a system for detecting a current position of a moving body such as the moving vehicles as described above, there has been proposed a system provided with a means for scanning a light beam emitted from a moving body in the circumferential direction or every azimuthal directions centering around the moving body, light-reflecting means for reflecting to return the light beam in the direction of incident light and secured at at least three positions apart from the moving body, and a beam receiver means for receiving light reflected from the light-reflecting means (Japanese Patent Laid-open No. 67476/1984).

In the above mentioned prior art, differential azimuths between adjoining two of three light-reflecting means centering around the moving body are detected on the basis of received beam output of the light-receiving means, and then a position of the moving body is operated based on the detected differential azimuths and positional information of the light-reflecting means which have been previously set.

In the above described system, however, problems have occurred where the light beam emitted from a beam source mounted on the moving vehicle could not be directed to the light-reflecting means positioned at reference points because of an inclination or vibration of the moving vehicle, or where the light-receiving means on the moving vehicle receives light reflected from objects other than the expected light-reflecting means described above.

When real reflected light is not positively received by a light-receiving means, the position of the moving vehicle is erroneously calculated so that the moving vehicle cannot be traveled along a prescribed course.

Meanwhile, there has been proposed a method for detecting positions of the moving body which is so arranged that the scanning rate and scanning angle of the light beam are allowed to change thereby positively directing the light beam to the light-reflecting means by, for example, Japanese Patent Laid-open No. 104503/1984. Furthermore, Japanese Patent Laid-open No. 211816/1984 proposes a system for detecting positions of the moving body which is so arranged that incident light produced on the moving body is converted into intermittent and periodical light, whereby the incident light is allowed to discriminate from the light emitted from the other light source.

However, these prior systems involve problems that both the system constructions become complicated, for example, the former method which changes a scanning rate and angle of light beam is required to vary frequently driving current in an optical scanner, and the latter system which is adapted to produce intermittent and periodical incident light is required to provide a complicated beam source section for producing the incident light.

In either prior art system, there has been a further problem that the position of the moving vehicle cannot be detected where there is any trouble in a photosensor system such as a light-receiving means and light-reflecting means, or where there is a trouble in a rotary table driving section for revolving the photosensor system such as the light-receiving means and the like, or where some or all of the light-reflecting means from which the reference signals of calculation are obtained tilt over.

Furthermore, there has been a problem that the reflected light cannot be positively received by a moving vehicle because of contamination on a reflecting surface of light-reflecting means, or such unexpected appearance of obstruction that man or other substance goes across the light-reflecting means as well as obstacles due to inclination or vibration of the moving vehicle. In this respect, these problems as mentioned above could not have been solved by only the above described prior art systems.

SUMMARY OF THE INVENTION

It is an object of the present invention to provide a position-detecting and steering control system for a moving vehicle which can solve the above described prior art problems and which can take appropriate measures in such a manner that the moving vehicle is prevented from traveling in an erroneous direction in even the case where an unexpected situation such as troubles of the light-reflecting means arises, and the case where the moving vehicle has momentarily missed the light-reflecting means which are expected to be reference points for detecting a position of the moving vehicle.

The present invention is characterized by that in a steering control system for a moving vehicle wherein a light beam emitted from the moving vehicle is scanned in centering around the moving vehicle along the circumferential direction thereof, and the light beam reflected by light-reflecting means disposed at at least three reference points and reflecting incident light in the incident direction, is received to detect a position of the moving vehicle comprising, an azimuth detection means for detecting azimuths of the respective light-reflecting means with respect to an advance direction of the moving vehicle, a position calculation means for calculating the position of the moving vehicle based on the azimuths detected, and a means for stopping travel of the moving vehicle when a following beam signal has not been detected over a predetermined period of time after detecting a preceding beam signal from a particular light reflecting means.

The moving vehicle of the present invention is further characterized by comprizing an azimuth prediction means for predicting a azimuth of the light-refelcting means to be detected in the next scanning cycle based on the azimuth having been detected by the azimuth detection means. a position calculation means for calculating the position of the moving vehicle based on the detected azimuth when the detected azimuth of the light-reflecting means is in the azimuth predicted in the azimuth prediction means, and an azimuth presumption means for presuming the azimuth of the light-reflecting means which is not detected when the light-reflecting means is not detected in the predicted azimuth. The predicted azimuth has a predetermined range and the predetermined range is set on the basis of at least one azimuth which has been detected lastly And the moving vehicle according to the present invention is stopped when occasions of no detection of the light-reflecting means in the predicted azimuth continuously appear by a prescribed number of times.

In the present invention, the light other than the reflected one which should be detected in an expected or predicted azimuth is never detected erroneously as the relevant light reflected by the light-reflecting means. Furthermore, in also the case where the light reflected by the light-reflecting means is not inputted momentarily, calculation of the position of the moving vehicle can be continued.

Moreover, according to the present invention, the moving vehicle can be allowed to stop when there is a succession in no detection of reflected light or such no detection is frequently observed, and hence traveling of the moving vehicle in an erroneous direction can be prevented.

BRIEF DESCRIPTION OF THE DRAWINGS

FIG. 3 is a flowchart showing a steering control;

FIGS. 4A-4D is a flowchart showing a processing for discriminating reference points;

DETAILED DESCRIPTION OF THE PREFERRED EMBODIMENTS

Figure 10:
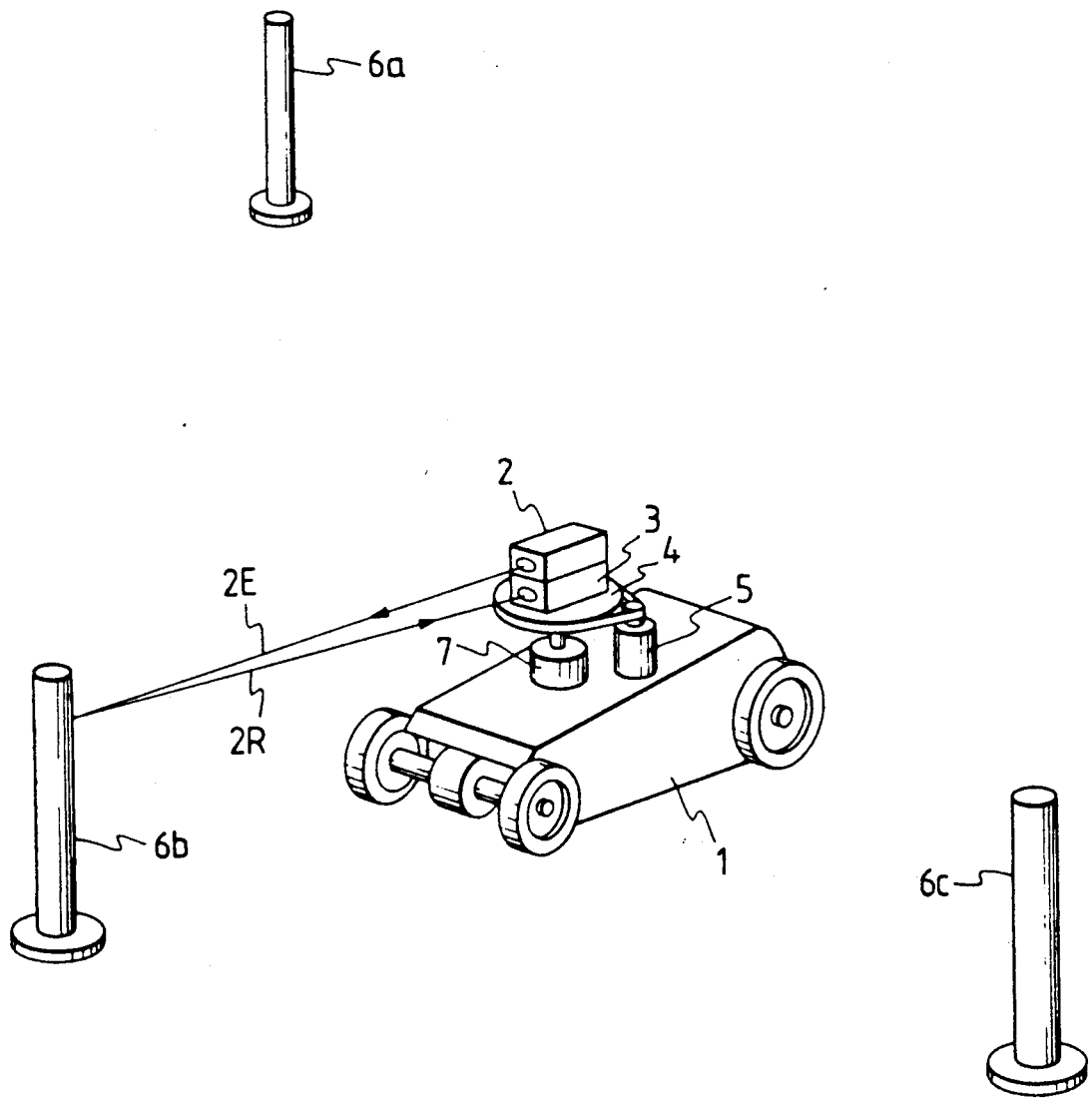
FIG. 10 is a perspective view showing a situation of arrangement of the moving vehicle and reflectors.

An embodiment of the present invention will be described hereinbelow by referring to the accompanying drawings. FIG. 10 is a perspective view showing a state of arrangement in respect of a moving vehicle carrying the control system according to the present invention and light reflectors disposed in an area in which the moving vehicle travels In FIG. 10, the moving vehicle 1 is one for use in agricultural working such as a lawn mower and the like. A rotating table 4 driven by a motor 5 is mounted on the upper part of the moving vehicle 1. The rotating table 4 mounts a beam source 2 for emitting light beam 2E and a beam receiver 3 for receiving light 2R reflected by each of the reflectors 6a-6c for reflecting the light beam 2E. The beam source 2 is provided with a light beam emitting means (light-emitting diode) and the beam receiver 3 is provided with a means for receiving incident light to convert it into an electrical signal (photodiode) (both of them are not shown). Furthermore a rotary encoder 7 is disposed so as to be interlocked with a drive shaft of the rotating table 4, so that when pulses output from the rotary encoder 7 are counted, a turning angle of the rotating table 4 can be detected.

The reflectors 6a-6c are located around a working area of the moving vehicle 1. Each of the reflectors 6a-6c has a reflection surface reflecting incident light in the incident direction and for this purpose, a so-called corner cube prism which has been conventionally available on the market and the like may be used.

Next, the construction of the control system in the present embodiment will be described in accordance with the block diagrams of FIGS. 1 and 2 wherein the light beam 2E emitted from the beam source 2 is scanned in a rotating direction of the rotating table 4 and the light beam 2E is reflected by one of the reflectors 6a-6c. The light beam 2R reflected by the one of the reflectors 6a-6c is introduced into the beam receiver 3.

In a counter 9, the number of pulses output from the rotary encoder 7 is counted in accordance with rotation of the rotating table 4. The count value of the pulses is transferred to a discrimination processing means 11 in every reception of the reflected light beam in the beam receiver 3. In the discrimination processing means 11, an azimuth of each reflector 6 with respect to the advance direction of the moving vehicle 1 is calculated on the basis of the count value of the pulses transferred in every reception of the reflected light beam.

The azimuthes detected in the discrimination processing means 11 are inputted to a differential azimuth operating means 10, where each angle defined between the adjoining two reflectors 6a-6c, respectively, viewed vehicle 1, i.e., a differential azimuth is operated.

In a position-advance direction operating means 13, a current position coordinate of the moving vehicle 1 is operated on the basis of the above described differential azimuths, so that the advance direction of the moving vehicle 1 is operated based on the azimuths. The results of the operation are inputted to a comparing means 25. In the comparing means 25, data indicating a traveling course set in a traveling course setting means 16 are compared with the coordinates and the advance direction of the moving vehicle 1 obtained in the position-advance direction operating means 13.

The comparison results are supplied to steering means 14, and a steering motor (M) 35 connected to front wheels 17 of the moving vehicle is driven on the basis of the above-mentioned comparative results. An angle of steering for the front wheels 17 driven by the steering motor 35 is detected by means of a steering angle sensor 15 mounted on the front wheels of the moving vehicle 1, and fed back to the steering means 14.

A driving means 18 controls starting and stopping of an engine 19 as well as operation of a clutch 20 for transmitting the power of the engine 19 to rear wheels 21.

Figure 1:
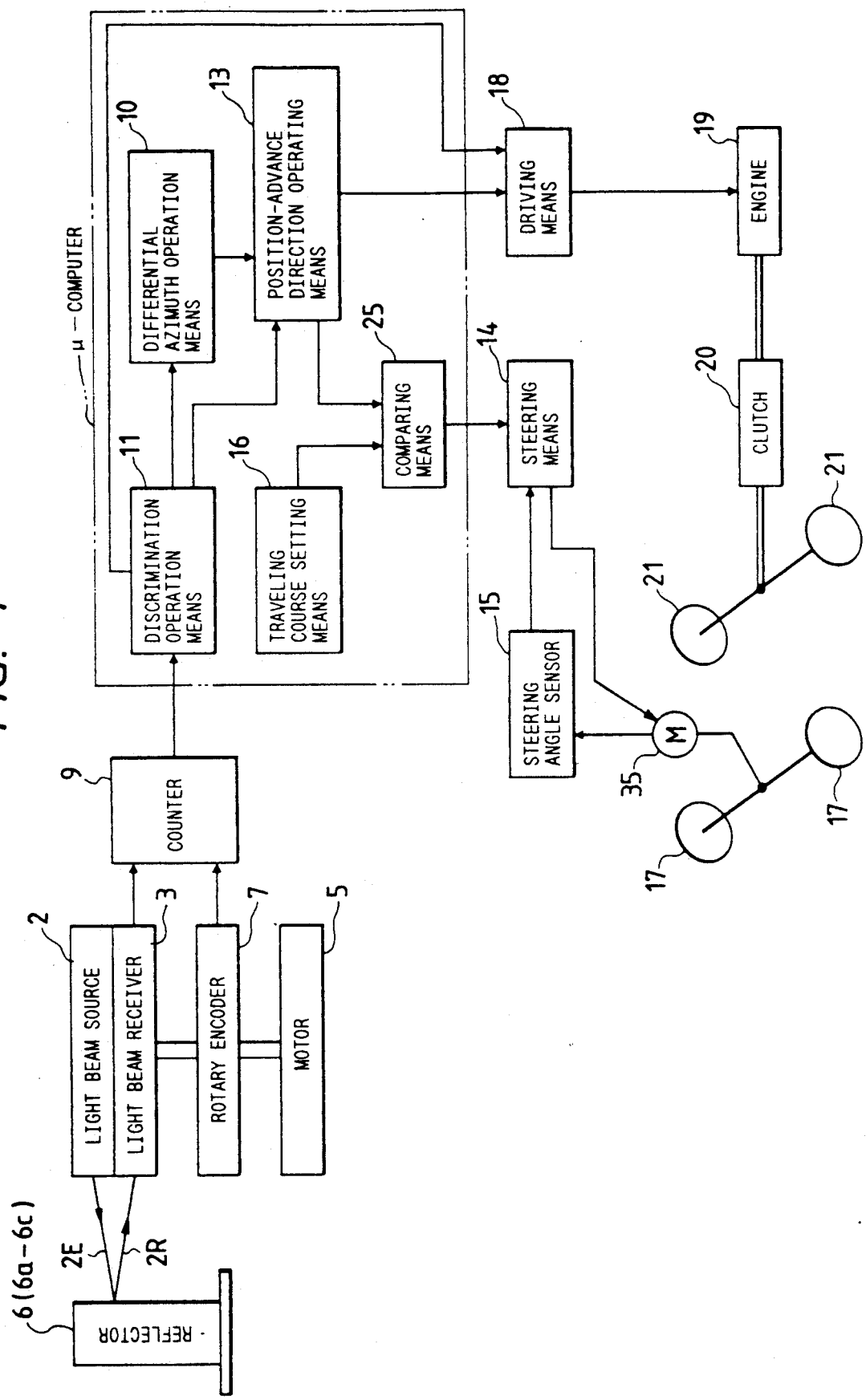
FIG. 1 is a block diagram showing an embodiment of the present invention.

Incidentally, of the structural elements shown in FIG. 1, the portion surrounded by a chain line may be constructed by a microcomputer.

Next, the detailed construction of the discrimination processing means 11 will be described hereinbelow. In the discriminating processing means 11, the azimuths are found and at the same time, discriminating and missing processings for the light beam reflectors 6 are carried out on the basis of the azimuths.

Figure 2:
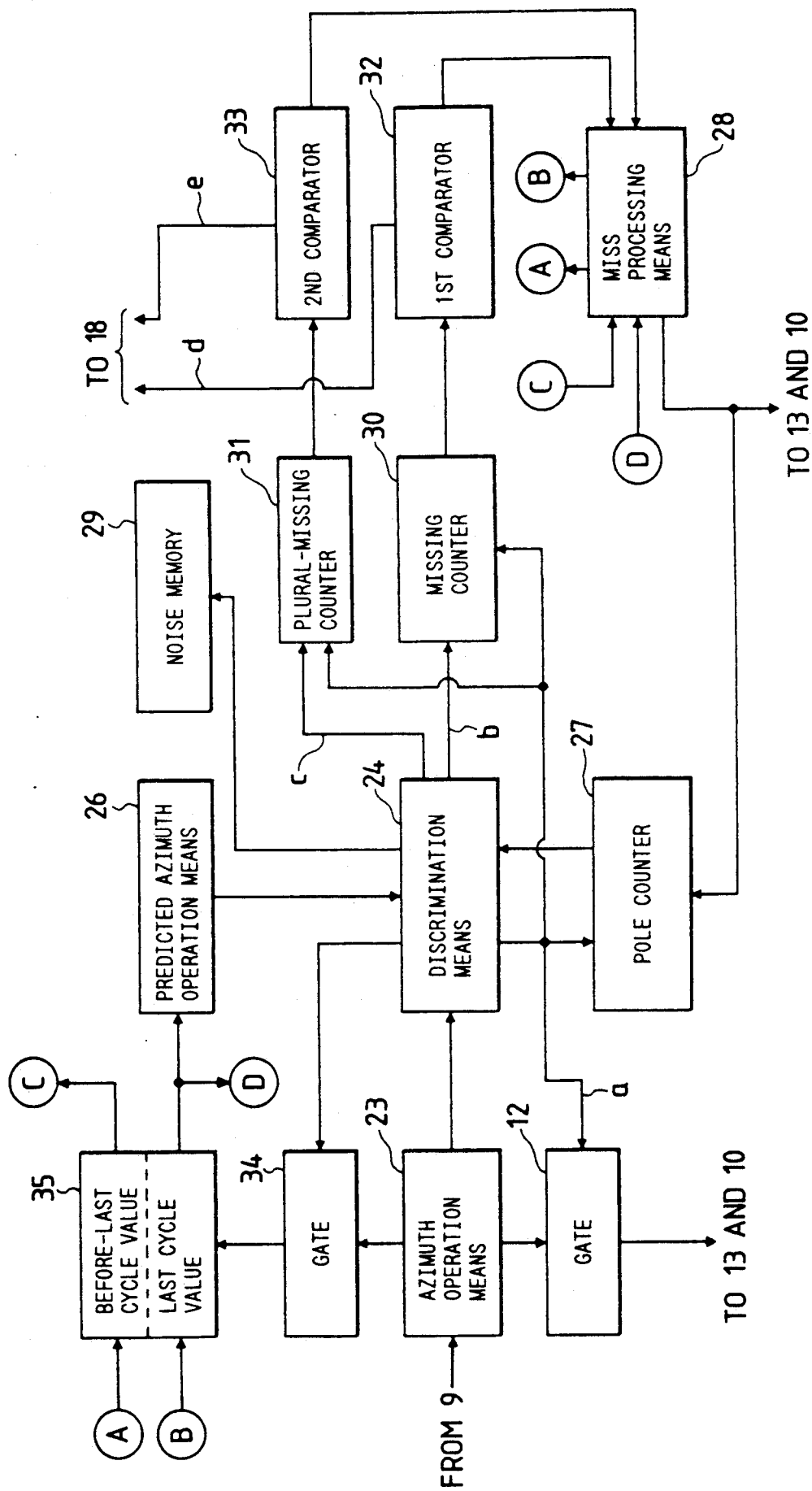
FIG. 2 is a detailed block diagram showing a discrimination processing means of FIG. 1.

Referring to FIG. 2, the azimuths of the respective reflectors 6 are operated with respect to the advance direction of the moving vehicle 1 on the basis of a count value of the counter 9 in the azimuth operating means 23. In an azimuth storing means 35, one azimuth for a certain reflector 6 which is detected in the last cycle as well as another azimuth for the same reflector 6 which has been detected in the before-last cycle are stored.

More specifically, a pair of azimuths which were detected in the last and the before-last detection cycle are stored in the storing means 35 in respect of an azimuth $\theta a$ for the reflector $6a$ located at reference point A, an azimuth $\theta b$ for the reflector $6b$ located at reference point B, and an azimuth angle $\theta c$ for the reflector $6c$ located at reference point C, respectively. Based on the last azimuth, a predictive azimuth which is to be detected in respect of some particular reflector 6 in the next step is operated in a predictive azimuth operating means 26 wherein the predictive azimuth has a predetermined range.

In the discrimination means 24, the predictive azimuth is compared with the actual azimuth which has been operated by the azimuth operating means 23. Furthermore, to the discrimination means 24 are also inputted count values obtained from a pole counter 27 which is so constructed that the count values thereof are renewed to count values which are adapted to correspond to the respective reflectors 6 in every detection of the reflectors $6a$–$6c$ located at the reference points A, B and C, respectively, so that the counted values are compared with the predictive values.

In accordance with a comparative result of the predictive azimuth with the actual azimuth in the discrimination means 24 as well as a comparative result of the count values in the pole counter 27 with the predetermined numerical values, it is judged whether or not a signal detected in the beam receiver 3 is a real detection signal of the reflected light from the predictive reflector 6.

In the case when the reflected light from the expected reflector 6 is detected, a gate 12 is opened in response to a signal output "a" from the discrimination means 24, and as a result the actual azimuth is inputted to the differential azimuth operating means 10 and the position-advance direction operating means 13.

On the contrary, when it is judged that the detection signal in the beam receiver 3 is one from the reflector 6 other than the expected reflector 6, the count value in a missing number counter 30 is renewed by a signal "b" as a result of having missed the expected reflector 6.

In the case when the detection signal in the beam receiver 3 is judged to be a signal from the reflector 6 other than the expected reflector 6 and two of the expected reflectors 6 have been serially missed, a count value is renewed in a plural missing number counter 31 in response to a signal "c". When the detection signal in the beam receiver 3 is a signal from something other than the reflectors 6, the signal is processed as noise, and a position of the moving vehicle 1 at the time of receiving the noise and an azimuth of a noise source viewed from the moving vehicle 1 are stored in a noise storing means 29.

The count value in the counter 30 is compared with a first threshold value T1 in a first comparing means 32, while the count value in the counter 31 is compared with a second threshold value T2 in a second comparing means 33. In the case where the count values (missing number) are less than the threshold values in both the comparing means 32 and 33, a processing for estimating an actual azimuth is effected in a miss processing means 28 on the basis of the last and the before-last azimuths stored in the azimuth storing means 35.

After being processed by the miss processing means 28, the last and the before-last azimuths in the azimuth storing means are renewed. Furthermore, when the count values (missing numbers) stored in the counters 30 and 31 are not less than the threshold values T1 and T2, respectively, signals "d" and "e" are output to the driving means 18 thereby stopping the travel of the moving vehicle 1.

Since missing of two adjoining reference points is more serious than missing a single reference point, a larger number of times is generally set for the threshold value T1 than that for the threshold value T2. In other words, when two adjoining reference points were missed, the moving vehicle 1 is controlled to stop in good time so as not to increase significantly the missing number of times. When it is judged by the discrimination means 24 that light reflected from the expected reflector 6 is received, the signal "a" is output, whereby the number of times "0's" are reset in the missing number counter 30 and the plural missing number counter 31, respectively.

A value in the pole counter 27 is renewed in the case when it is judged by the discrimination means 24 that the expected reflector 6 has been normally detected as well as the case when missing processing has been completed. In the case when the expected reflector 6 has been normally detected, a gate 34 is opened, and the last azimuth and the before-last azimuth in the azimuth storing means 35 are renewed by the latest azimuth and the last azimuth, respectively.

A fundamental principle for detecting the position and the advance direction of the moving vehicle 1 will be described hereinbelow in accordance with the present embodiment having the above described construction. In this connection, the fundamental principle is fully described in U.S. Pat. application Ser. Nos. 344,574 and 362,630 (now U.S. Pat. No. 4,947,324).

Figure 7:
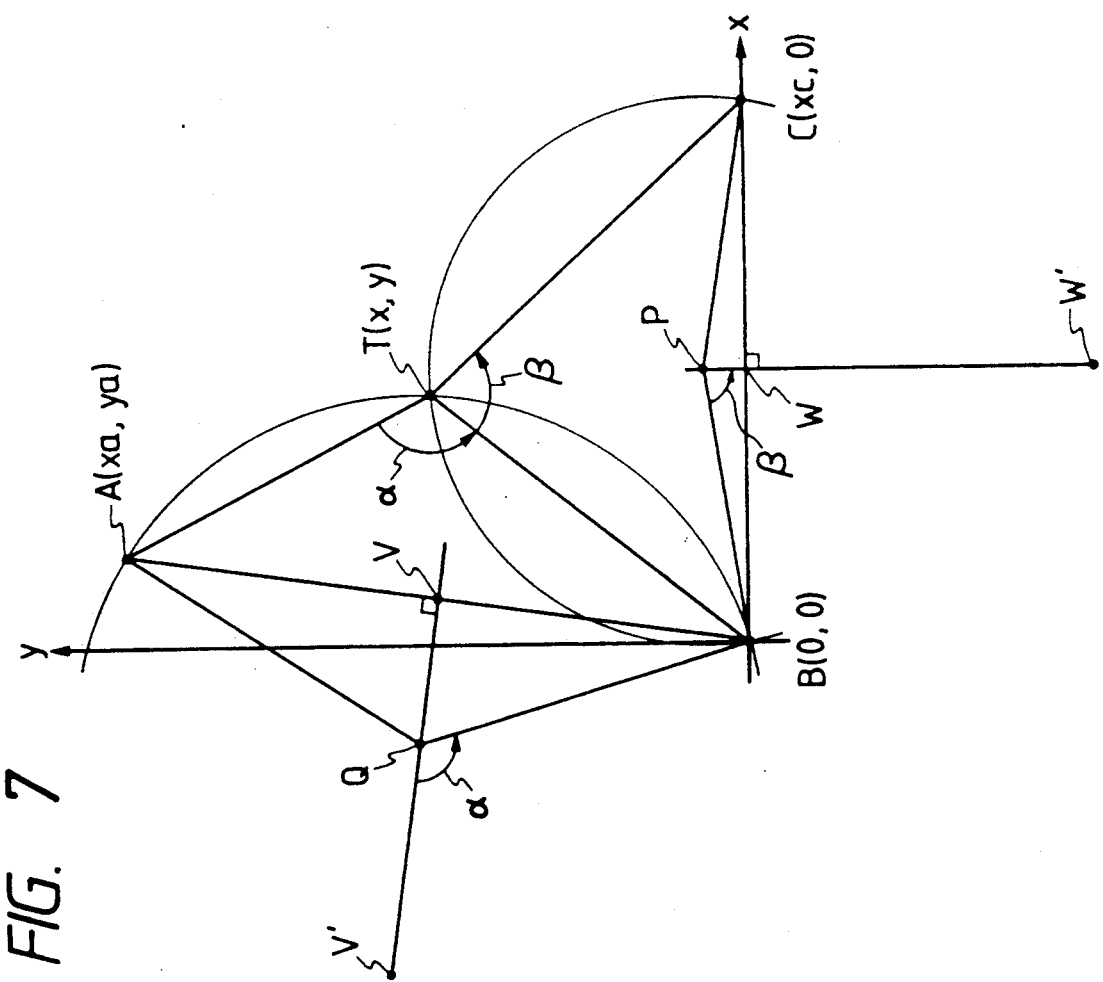
FIG. 7 is an explanatory graphical representation for explaining the principle of detecting positions of the moving vehicle.
Figure 8:
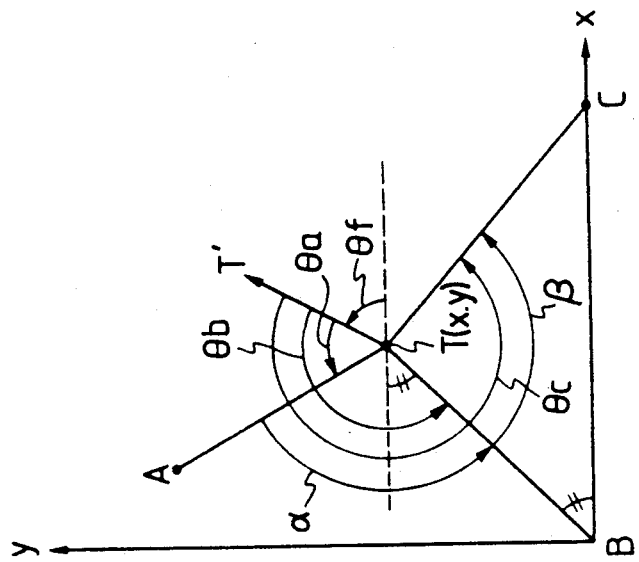
FIG. 8 is an explanatory graphical representation for explaining the principle of detecting traveling azimuths of the moving vehicle.

FIGS. 7 and 8 are explanatory graphical representations each showing the position T of the moving vehicle 1 and that of the reflector 6 in a coordinate system for indicating a working area of the moving vehicle 1.

In FIGS. 7 and 8, disposed positions of the reflectors $6a$–$6c$ are indicated by points A, B and C (hereinafter referred to as "reference points A, B and C"). In these figures, the positions of the reference points are represented by an x-y coordinate system wherein the reference point B is the origin, and a line extending between the reference points B and C is x-axis.

As is apparent from FIG. 7, the position T of the moving vehicle is on a first circumscribed circle Q for a triangle ATB as well as a second circumscribed circle P for a triangle BTC. Accordingly, when two points of intersection of two circumscribed circles Q and P for the triangles ATB and BTC are calculated, the position of the moving vehicle 1 is fixed. In this case, since the reflector $6b$ is the origin, the other intersection T of two circumscribed circles P and Q is calculated in accordance with the following procedure so that a position of the moving vehicle 1 is found.

First, if the center of the circumscribed circle P for the triangle BTC is represented by P, the center P resides on a perpendicular bisector of a segment of the line BC, and it gives the following equation, $$<BPW'=\beta$$

where W' is a point on the perpendicular bisector of the segment BC and which resides on the side opposite to the point T with respect to the straight line BC and is sufficiently apart from the straight line, from a relationship between the central angle and the angle of circumference $\beta$.

Observing a triangle BPW (W is the midpoint of the segment BC), coordinates of the center of the circle P and a radius thereof are $\{xc/2, (xc/2) \cot \beta\}$ and $xc/(2 \sin \beta)$, respectively. Hence, the circumscribed circle P is represented by the following equation.

$$(x-xc/2)^2 + \{y-(xc/2)\cot \beta\}^2 = \{xc/(2 \sin \beta)\}^2$$

When the equation is rearranged, the following equation (1) is obtained.

$$x^2 - xc.x + y^2 - xc.y.\cot \beta = 0 \quad (1)$$

When the center of the circumscribed circle Q for the triangle ATB is fixed as Q, the center Q resides on a perpendicular bisector of a segment of the line AB, and it gives the following equation, $$<BQV'=\alpha$$

where V' is a point on the perpendicular bisector of the segment AB and which resides on the side opposite to the point T with respect to the straight line AB and is sufficiently apart from the straight line.

Observing a triangle BQV (V is the midpoint of the segment AB), coordinates of the center of the circle Q and a radius thereof are $\{xa/2 + (ya/2) \cot \alpha, Ya/2 - (xa/2) \cot\alpha\}$ and $$|\sqrt{xa^2 + ya^2} /(2 \sin \alpha)|,$$

respectively. Hence, the circumscribed circle Q is represented by the following equation (2).

$$x^2 - x(xa + ya.\cot\alpha) + y^2 - y(ya - xa.\cot \alpha) = 0 \quad (2)$$

From the above equations (1) and (2), coordinates (x, y) of the point T are calculated from the following equations (3) and (4).

$$x = xc(1 + k.\cot \beta)/(1 + k^2) \quad (3)$$

$$y = kx \quad (4)$$

where k is represented by an equation (5):

$$k = (xc - xa - ya.\cot \alpha)/(ya - xa.\cot \alpha xc.\cot \beta) \quad (5)$$

and which indicates an inclination of a straight line BT with respect to the x-axis.

Furthermore, an advance direction of the moving vehicle 1 is calculated as follows. In FIG. 8, assuming that an angle between the advance direction TT' of the moving vehicle 1 and x-axis is $\theta f$, and the differential azimuths of the respective reflectors 6a, 6b and 6c (points A, B and C, respectively) with respect to the advance direction as reference are $\theta a$, $\theta b$ and $\theta c$, since the inclination of the segment BT is k, it gives the following equation, $$\theta f = 360° - \tan^{-1}\{y/(xc-x)\} - \theta c \quad (6)$$

Figure 9:
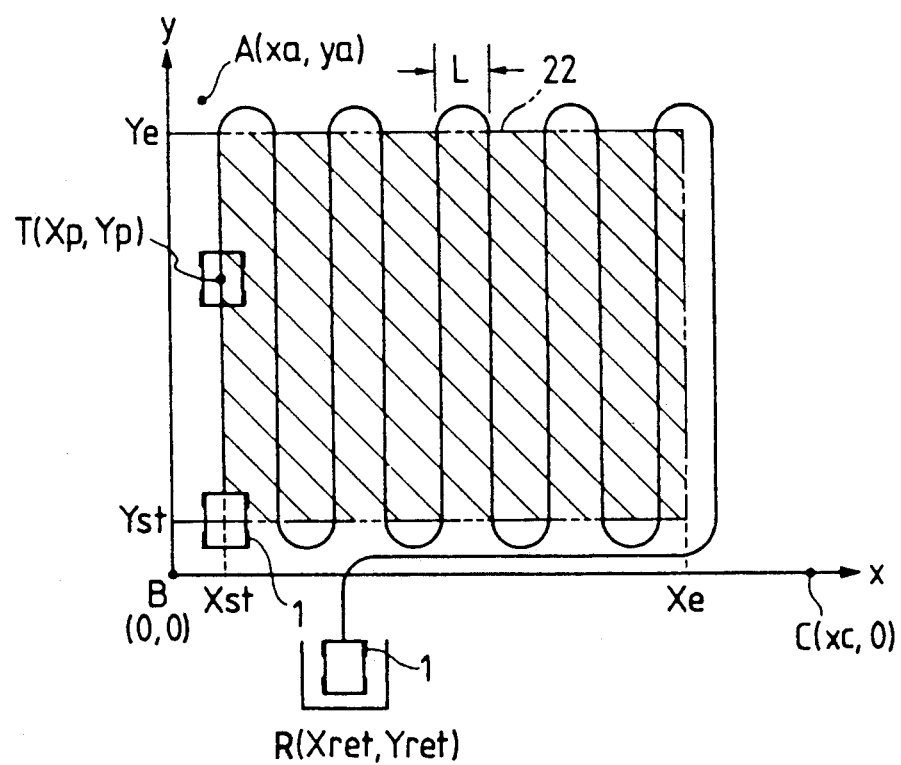
FIG. 9 is a graphical representation showing a situation of arrangement of a traveling course of a moving vehicle and reflectors.

Next, steering control for the moving vehicle 1 based on the positional information of the moving vehicle calculated in accordance with the above procedure will be described hereinbelow. FIG. 9 is a schematic diagram showing a traveling course of the moving vehicle 1 and the coordinates of the reflectors 6, and FIG. 3 is a flowchart illustrating a procedure for steering control.

In FIG. 9, points A, B and C indicate positions at which the reflectors 6a-6c are disposed, and the current position T and the working area 22 of the moving vehicle 1 are represented by a coordinate system wherein the point B is fixed as the origin, and a straight line extending between the points B and C is defined as x-axis. (Xret, Yret) indicate coordinates of a returning position R of the moving vehicle 1, and the working area 22 is a quadrilateral region including four apexes of the points represented by four coordinates (Xst, Yst), (Xst, Ye), (Xe, Yst) and (Xe, Ye). In this case, the current position of the moving vehicle 1 is represented by T(Xp, Yp).

For the simple explanation, while an example wherein four sides of the working area 22 are parallel to x- or y-axes is shown in FIG. 9, other directions and/or shapes of the working area may be selected so far as the points A-C are disposed around the working area 6.

In accordance with the flowchart shown in FIG. 3, a control procedure will be described hereinbelow in which it is assumed that the moving vehicle 1 reciprocates in parallel to the y-axis as in the traveling locus of FIG. 9, and the pitch therefor is L.

First of all, in step S1, the moving vehicle 1 is transferred by means of, for example, radio control from a point R to a position where working is started.

In step S2, the beam emitter 2 and the beam receiver 3 are rotated while stopping the moving vehicle 1 to detect the respective reference points A, B and C, and at the same time azimuths of the respective reference points viewed from the moving vehicle 1 are stored in the storing means 35.

In step S3, Xst is set as an X-coordinate Xn for a traveling course thereby to fix the traveling course.

Traveling of the moving vehicle 1 is started in step S4.

It is judged in step S5 whether or not reflected light from any reference point is received by the beam receiver 3. The step 5 is repeated until the reflected light is detected. When reflected light has been detected, the operation proceeds to step S6, and a subroutine process for discriminating reference points which will be described hereinafter is carried out.

The present position (Xp, Yp) and an advance direction Of of the moving vehicle 1 is operated in step S7.

In step S8, a deviation amount of the traveling course $(\Delta X = Xp - Xn, \Delta\theta f)$ is operated, and a steering angle is controlled in step S9 by the steering means 14 in response to the amount of deviation calculated.

In step S10, it is judged that either the moving vehicle 1 travels towards the direction going away from the origin (forward direction) or the direction approaching the origin (reverse direction) in the y-axial direction.

In case of forward direction, it is judged whether one stroke has been finished (Yp>Ye) or not in step S11, while in case of reverse direction, it is judged whether one stroke has been finished (Yp<Yst) or not in step S12. When it is judged that such one stroke has not been finished in either step S11 or step S12, processings in steps S5–S10 are repeated.

In case where it is judged that one stroke has been finished in either step S11 or step S12, it is judged in the following step S13 whether all of the strokes have been finished (Xp>Xe), or not.

When all strokes have not been finished, the procedure shifts from step S13 to step S14 to effect U-turn control of the moving vehicle 1. U-turn control is carried out in accordance with a different method from the one for steering control in a straight traveling course which is effected according to processing steps S7–S9 wherein the positional information of the moving vehicle 1 operated by the position-advance direction operating means 13 is fed back to the steering means 14.

More specifically, it is adapted that the vehicle 1 is traveled while fixing a steering angle thereof at a predetermined angle in a turning course, and the moving vehicle returns to steering control in a straight traveling course which is effected in accordance with processings of steps S5–S9 at the time when at least one of azimuths of the respective reflectors 6 viewed from the vehicle 1 substantially falls in a predetermined range of a corresponding azimuth. The details of U-turn control for traveling the moving vehicle along the turning course is described in detail in the U.S. Pat. application Ser. No. 362,630 (U.S. Pat. No. 4,947,324).

In step S15, a pitch L is added to Xn thereby operating (Xn+L) and the following traveling course is set. When set the following traveling course, the procedure returns to step S5 and the above described processings are repeated.

When all strokes have been completed, the moving vehicle returns to the return position R(Xret, Yret) in step S16, and the travel thereof stops in step S17.

Next, the processing for discriminating reference points in the step S6 will be described hereinbelow.

In the present embodiment, measures for discriminating reference points are such that the respective reference points A, B and C are allowed to correlate with count values of the pole counter 27, for example, reference points A, B and C are allowed to correlate with count value 1, 2 and 3, respectively, whereby the respective reference points are discriminated from one another. More specifically, the pole counter 27 outputs the count values 1, 2 and 3 in that order in every detection of the reflected light 2R by the beam receiver 3 and the reference points can be discriminated by supervising the count values.

In the case when a reference point has been lost, or reflected light is received from an object other than the reference points, the reference points do not correlate with the count values so that a position is erroneously detected in the above described measures. Accordingly, in a processing for discriminating reference points shown in a flowchart of FIG. 4, it is assumed that only the light detected within a predicted azimuth range is normal reflected light from an expected reference point. Under this assumption, in the processing shown in the flowchart of FIG. 4, it is judge whether or not the count values output from the pole counter 27 correspond to the reference points, and as a result it is concluded whether or not the expected reference points have been normally detected after all.

In accordance with the result of the aforesaid judgement, when it was judged that at least one of the reference points has been missed or that reflected light is received from an object other than reference points, the positional detection of the moving vehicle is continued in accordance with the undermentioned processing for missing reference points, or when the number of missing times of reference points exceeds a predetermined number of times, travel of the moving vehicle 1 is stopped.

Figure 11:
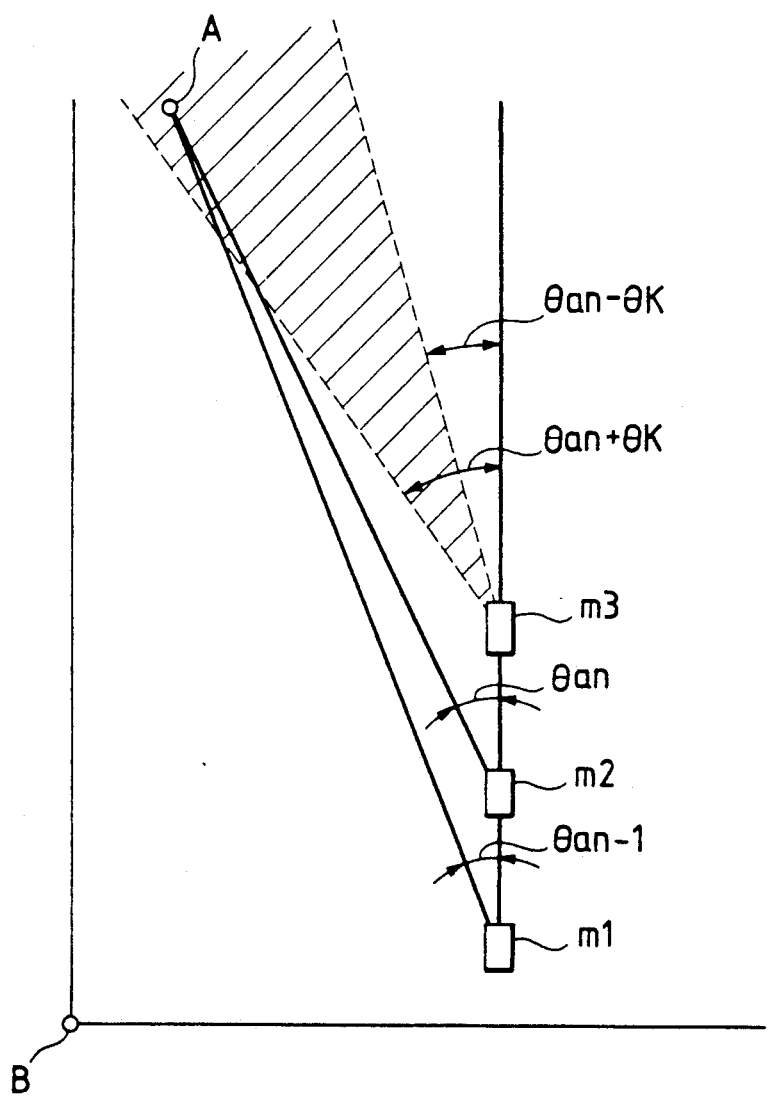
FIG. 11 is an explanatory view for explaining an azimuth of a reference point.

Next, a method for predicting the azimuth of a particular reference point will be described hereinbelow. FIG. 11 is a diagram showing changes in azimuth of the reference point A viewed from the moving vehicle 1 with the travel thereof wherein it is assumed that the azimuth at the just previous detection cycle time when the moving vehicle 1 exists at the point m1 is $\theta an-1$, and the azimuth at the current detection cycle time when the moving vehicle 1 exists at the point m2 is $\theta an$. In these circumstances, it is predicted that the azimuth at the next detection cycle time when the moving vehicle 1 exists at the point m3 is ($\theta an \pm \theta K$) where $\theta K$ is a fixed value. In this case, the fixed $\theta K$ is determined on the basis of an angle $\{\theta an - (\theta an-1)\}$ which is found experimentally.

According to the experiments by the present inventors, since $\{\theta an - (\theta an-1)\}$ falls within a range of about several degrees except for the case where the moving vehicle 1 is in the turning course, the fixed value $\theta K$ is set to 3 degrees in the present embodiment. However, the fixed value $\theta K$ is switched to a larger preset value than that in straight travel of the moving vehicle 1, because changes in the azimuth must be abrupt during turning of the moving vehicle 1. In the present embodiment, the fixed value $\theta K$ during turning of the moving vehicle 1 is set to 30 degrees. Either $\theta K$ may be set as such a fixed value which is based on the experiment as mentioned above, or a difference between two azimuths which were detected at the latest and the second latest detection cycle times and have been stored in the azimuth storing means 35 may be set as the value $\theta K$.

The method for predicting the azimuth of the reference point A has been described with reference to FIG. 11, and the azimuths of the other reference points B and C are similarly predicted.

Figure 4A:
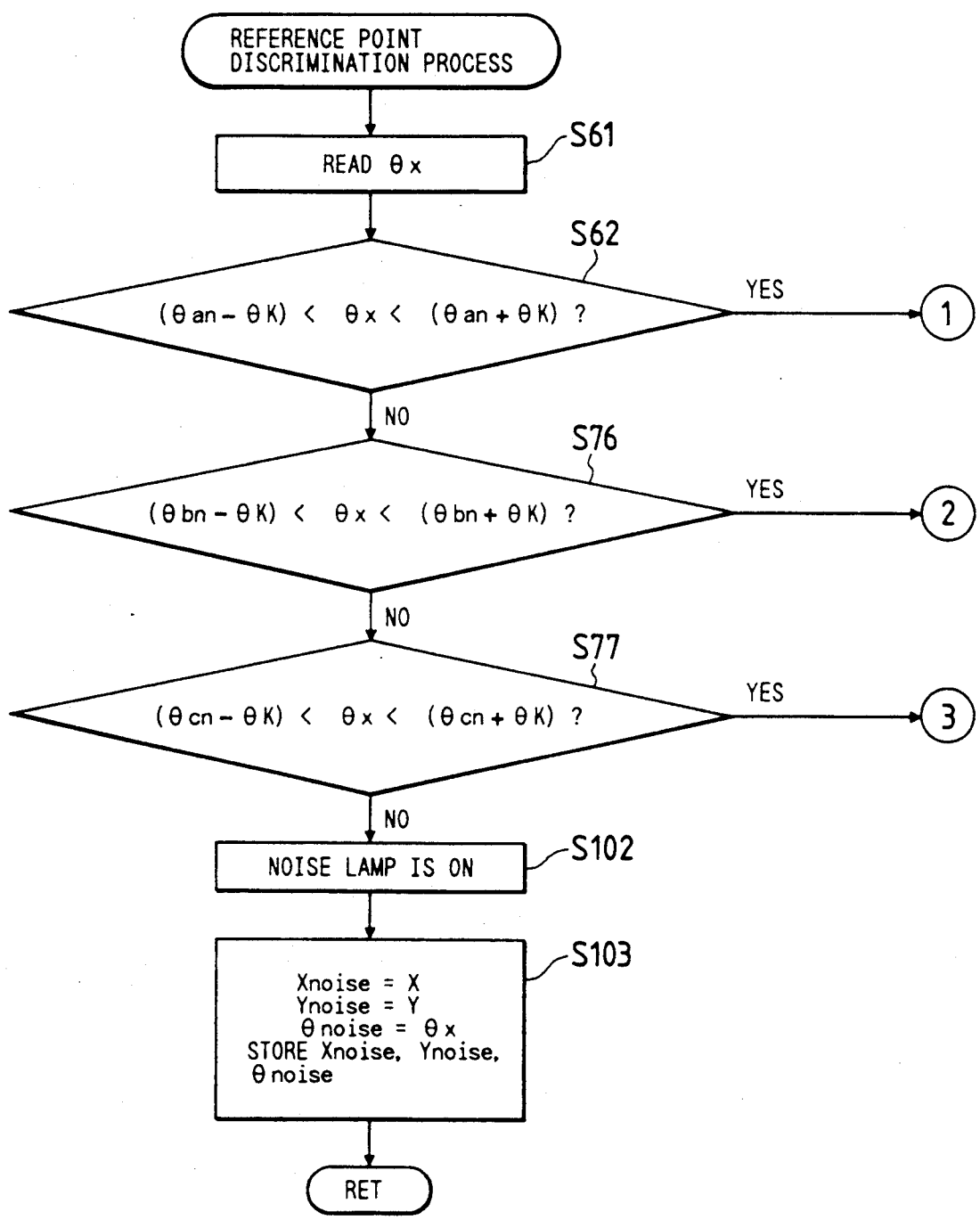
Figure 4C:
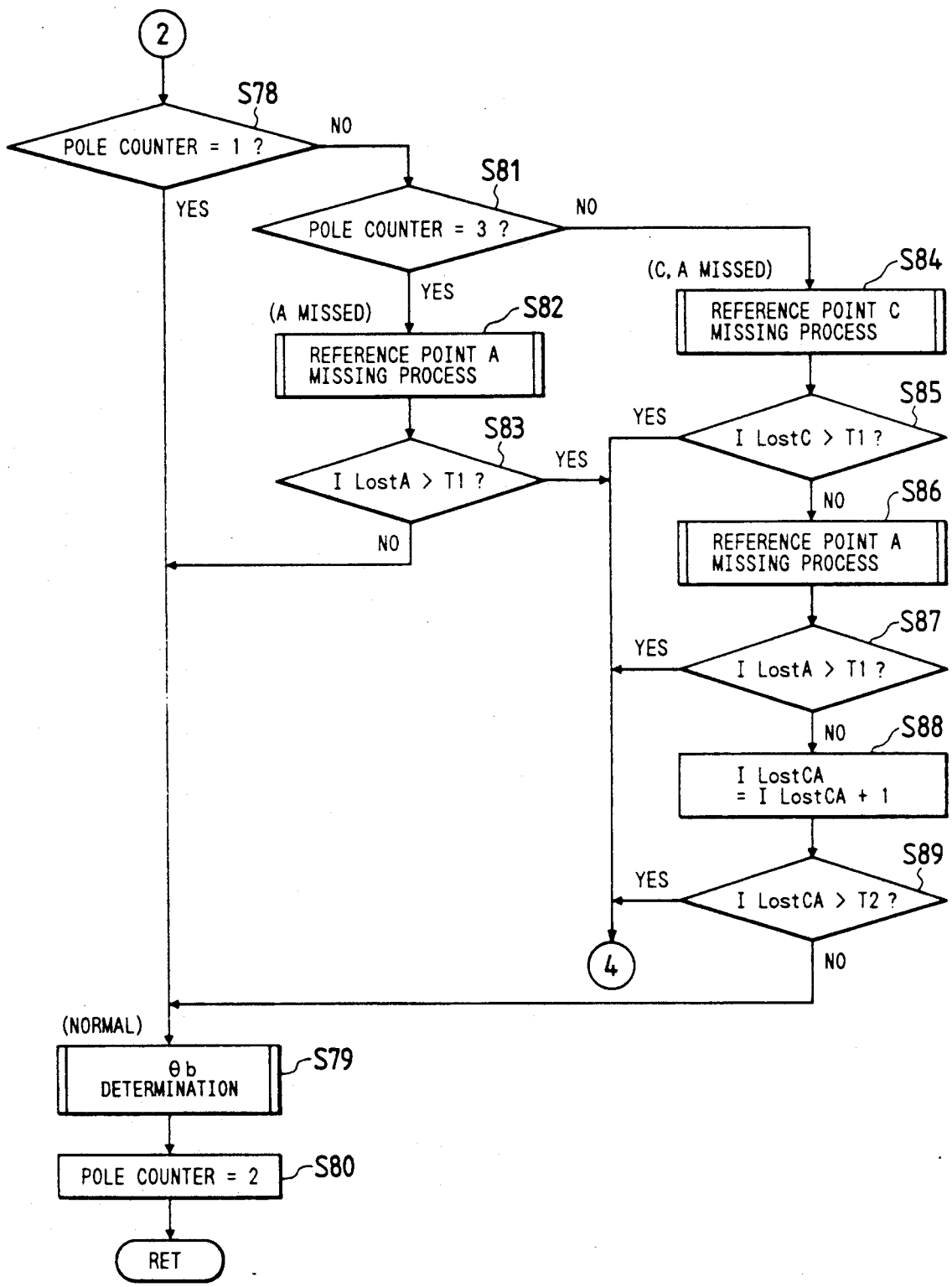
Figure 4D:
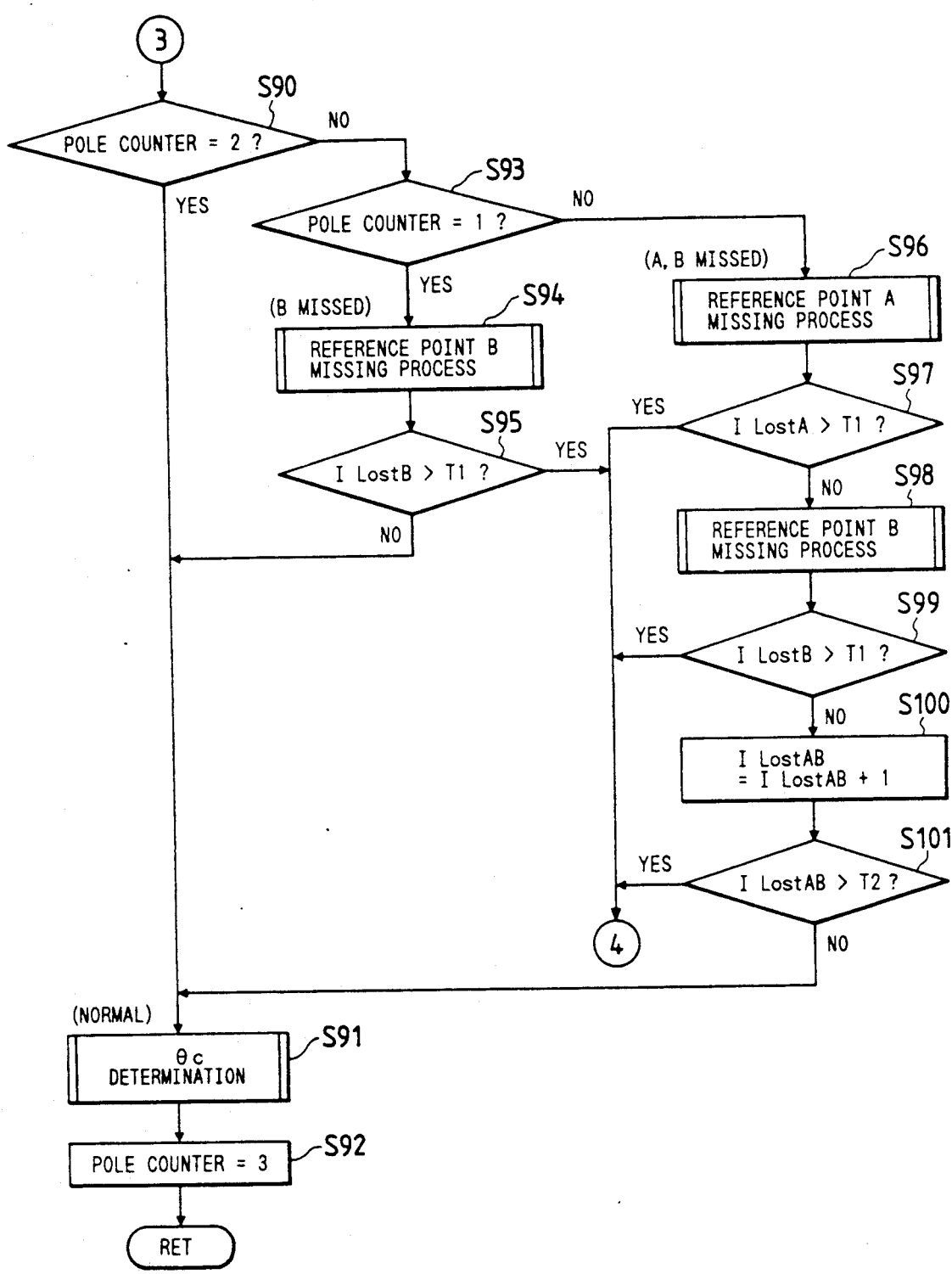

The processing for discriminating reference points will be explained in accordance with the flowchart shown in FIG. 4 wherein an azimuth of an object, by which light is reflected, with respect to the advance direction of the moving vehicle 1 which was calculated on the basis of the latest beam signal received is read in as $\theta x$ in step S61.

In step S62, it is judged whether or not $\theta x$ is within a range of ($\theta an \pm \theta K$). If the judgment in the step S62 is "YES", the received beam signal is assumed to be a reflected siGnal from the reference point A and the operation proceeds to step S63 on FIG. 4.

In the step S63, it is judged whether or not the count value in the pole counter 27 is a value "3" corresponding to the reference point C which is to be detected before the detection of the reference point A. If the counted value is "3", the assumption made in the step S62 that "the received beam signal is a reflected signal from the reference point A" is considered to be right, so that the processes in steps S64 and S65 are performed and the operation is returned to the step S7 in main routine (FIG. 3).

In the step S64, since the received beam signal has been judged to be the reflected signal from the reference point A, the azimuth $\theta a$ of the reference point A viewed from the moving vehicle 1 is determined. The details of the processing for determining the azimuth angle $\theta a$ will be described in conjunction with FIG. 5. In the step S65, a count value in the pole counter 27 is set to be "1" corresponding to the reference point A.

On the other hand, if it is judged in the step S63 that the count value in the pole counter 27 is not "3", the operation proceeds to step S66 where it is judged whether or not the count value in the pole counter 27 is "2". If the judgment in the step S66 is "YES" it is judged that the reference point C has been lost immediately before, so that the operation proceeds to step S67 where the missing of the reference point C is processed.

The details of the processing for the missing of the reference point C will be described by referring to FIG. 6. After completing the processing for the missing of the reference point C, the operation proceeds to step S68.

In the step S68, it is judged whether or not a missing number of times I LostC for the reference point C exceeds the threshold value T1. When it exceeds the threshold value T1, the operation proceeds to step S69 and the clutch 20 in the moving vehicle 1 is disconnected, the engine 19 is stopped, and a fail lamp is lit continuously or intermittently.

In the judgment in the step S68, when the missing number of times I LostC for the reference point C does not exceed the threshold value T1, the operation proceeds to the step S64.

If the judgment in the step S66 is "NO", it is judged that two adjoining reference points B and C have been lost. immediately before, so that the operation proceeds to step S70 where the missing of the reference point B is processed. After completing the processing for the missing of the reference point B, the operation proceeds to step S71.

In the step S71, it is judged whether or not a missing number of times I LostB for the reference point B exceeds the threshold value T1. When it exceeds the threshold value T1, the operation proceeds to step S69. In the judgment in the step S71, when the missing number of times I LostB for the reference point B does not exceed the threshold value T1, the operation proceeds to the step S72 where the missing of the reference point C is processed.

In step S73, it is judged whether or not a missing number of times I LostC for the reference point C exceeds the threshold value T1. When it exceeds the threshold value T1, the operation proceeds to step S69. In the judgment in the step S73, when the missing number of times I LostC does not exceed the threshold value T1, the operation proceeds to the step S74.

In the step S74, "1" is added to the number of times I LostBC memorized in the plural missing number counter 31 which shows how many times the reference points B and C have been serially missed. In step S75, it is judged whether or not the number of times I LostBC exceeds the threshold value T2. When the number of times I LostBC exceeds the threshold value T2, the operation proceeds to the step S69. When it is judged in the step S75 that the number of times I LostBC does not exceed the threshold value T2, the operation proceeds to the step S64.

When it is judged in the step S62 that the received beam signal is not within a range of $(\theta an \pm \theta K)$, the operation proceeds to step S76 where it is judged whether or not the received beam signal is within the range of $(\theta bn \pm \theta K)$. When it is judged that the received beam signal is within the range of $(\theta bn \pm \theta K)$, i.e., the beam signal of the light is reflected from the reference point B, the operation proceeds to step S78, and then the processings in steps S79-S89 follow.

Furthermore, the operation proceeds to step S77 when the judgment in the step S76 is "NO", and it is judged whether or not the received beam signal is within a range of $(\theta cn \pm \theta K)$ therein. When it is judged that the received beam signal is within the range of $(\theta cn \pm \theta K)$, i.e., the beam signal of the light is reflected from the reference point C, the operation proceeds to step S90, and then the processings in steps S91-S101 follow.

Since the processings in the steps S78-S89 as well as those in the steps S90-S101 are similarly carried out as in the processings in the steps S63-S75, the explanation therefor are omitted.

When each of the judgments in the steps S62, S76 and S77 is "NO", the received beam signal is not the light reflected from any of the reference points A, B and C. As a result, it is judged that the received beam is either reflected by an object other than the reference points, or received from an irrelevant beam source so that such beam signal is processed as noise.

When it is judged that the received beam signal is noise, the operation proceeds from the step S77 to a step S102 so that a noise warning lamp is tentatively lit.

In step S103, a coordinate of the moving vehicle 1 and an azimuth of a noise source viewed from the moving vehicle 1 are detected at the time when noise is detected, and these values are stored in the noise storing means 29.

Next, the operation for determination of azimuths $\theta a$-$\theta c$ of the reference points viewed from the moving vehicle 1 as well as the operation in the missed reference point processing means 28 will be described by referring to the flowcharts shown in FIGS. 5 and 6.

Figure 5A:
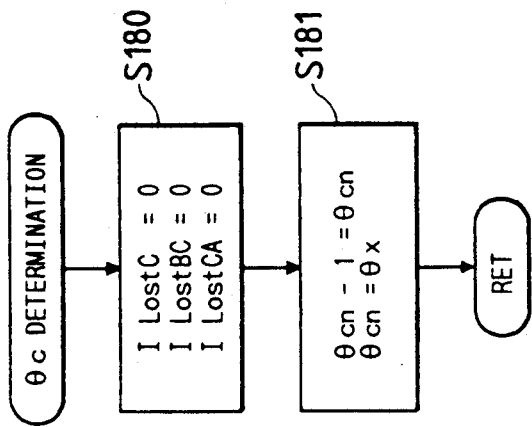
FIGS. 5A-5C is a flowchart showing a processing for determining azimuth.
Figure 5B:
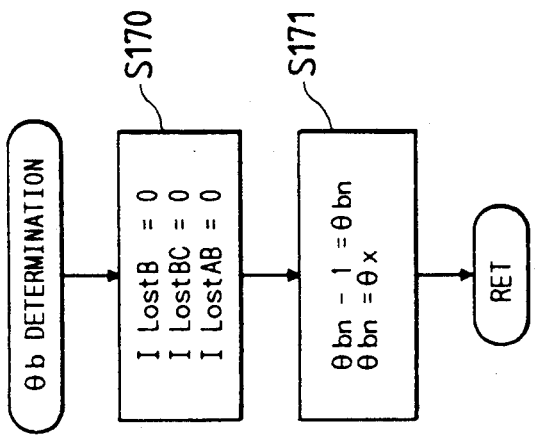
Figure 5C:
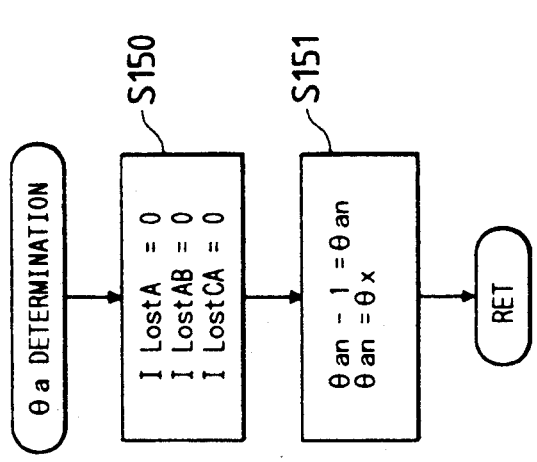

FIG. 5($a$) is a flowchart showing in detail the step S64 (FIG. 4) for determination of the azimuth $\theta a$ of the reference point A.

In step S110, "0" is set as the missing number of times of the reference point A, I LostA, in the missing number of times counter 30, and at the same time, "0's" are set as the numbers of times I LostAB and I LostCA in the plural missing number of times counter 31, respectively. In step S111, the azimuths $\theta an$ detected in the last detection cycle and $\theta x$ detected in the current detection cycle are in as $\theta an-1$ and $\theta an$, respectively, to renew the data.

Processings for determining the azimuths $\theta b$ and $\theta c$ of the reference points B and C are shown in FIGS. 5($b$) and 5($c$), respectively. They are the same as that for the azimuth $\theta c$ of the reference point A, and accordingly it can be easily understood from the above description so that the explanation therefor is omitted.

Figure 6C:
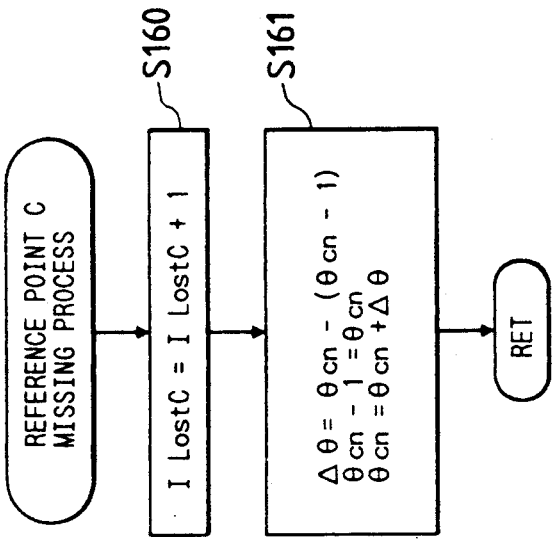
FIGS. 6A-6C is a flowchart showing a processing for reference points lost.

FIG. 6($c$) is a flowchart showing in detail the step S67 (FIG. 4) of the missing processing for the reference point C.

In step S120, "1" is added to the missing number of times of the reference point C, I LostC. In step S121, a difference $\{\theta cn - (\theta cn - 1)\}$ between a pair of the azimuths of the reference point C which have been detected in the last detection cycle and the current detection cycle are read as $\Delta \theta$, so that the azimuths $\theta cn-1$ detected in the before-last detection cycle and Ocn detected in the last detection cycle are renewed by the $\theta cn$ and $(\theta cn + \Delta \theta)$, respectively. The difference $\Delta \theta$ between the aforesaid azimuths is not limited to a result obtained by calculating $\{\theta cn - (\theta cn - 1)\}$, but a fixed value which has been set previously based on a value found by an experiment may be used as Δθ.

When a particular reference point ca not be detected within an expected range, the azimuth data of the particular reference point are presumed and renewed by the missing processing as described above on the basis of the azimuth data in the last and the before-last detection cycles, and then the current position and the advance direction of the moving vehicle 1 are calculated on the basis of the renewed data.

Figure 6B:
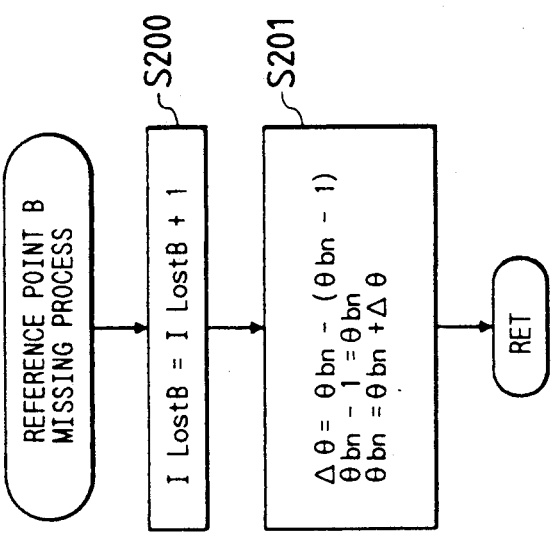
Figure 6A:
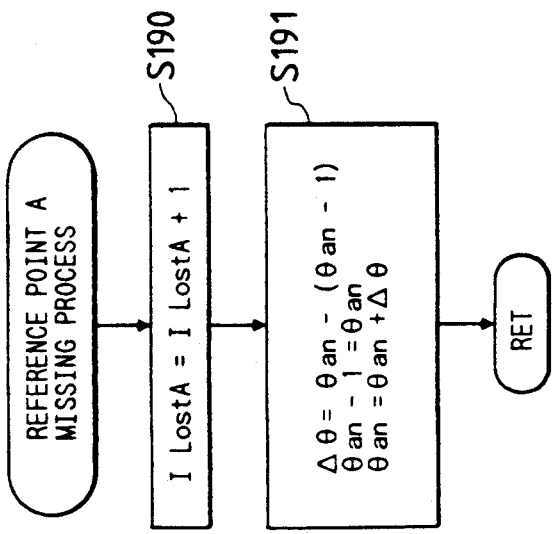

Missing processings for the reference points A and B are also similarly effected as for the reference point C as seen in FIGS. 6(a) and 6(b).

As described above, when light is detected by the beam receiver 3 in the present embodiment, it is discriminated whether or not the light is the one which is reflected by any one of the reflectors 6a-6c located at the predictive reference points. In only &he case where the light is the relevant one reflected by one of the expected reflectors 6, the position and the advance direction f the moving vehicle 1 are calculated on the basis of the beam signal received.

In case where the light reflected by the particular reflector is not received and the particular reference point has been lost, the azimuth of the particular reference point lost is presumed on the basis of the azimuths at which the beam signals received had been detected in the last and the before-last detection cycles, respectively, and the position as well as the advance direction of the moving vehicle 1 are calculated in accordance with the data on the presumed reference points.

Furthermore, it is arranged that travel of the moving vehicle is allowed to stop when the missing number of times of the reference points becomes more than a predetermined number of times. Particularly, when two reference points have been serially lost, travel of the moving vehicle 1 is stopped at an early stage.

Thus, according to the present embodiment, the moving vehicle 1 can travel continuously along a predetermined traveling course even if light reflected by a reference point is not normally detected due to a temporary obstruction. Moreover, travel of the moving vehicle 1 can be stopped when the obstruction is not temporary, whereby such travel of the moving vehicle 1 that the vehicle deviates from the predetermined course can be prevented from occurring.

While the explanation has been made on an example of the case where reference points are located at three places in the present embodiment, the present invention can be practiced by the same means as in the present embodiment in even the case where reference points are located at four or more places.

Figure 12:
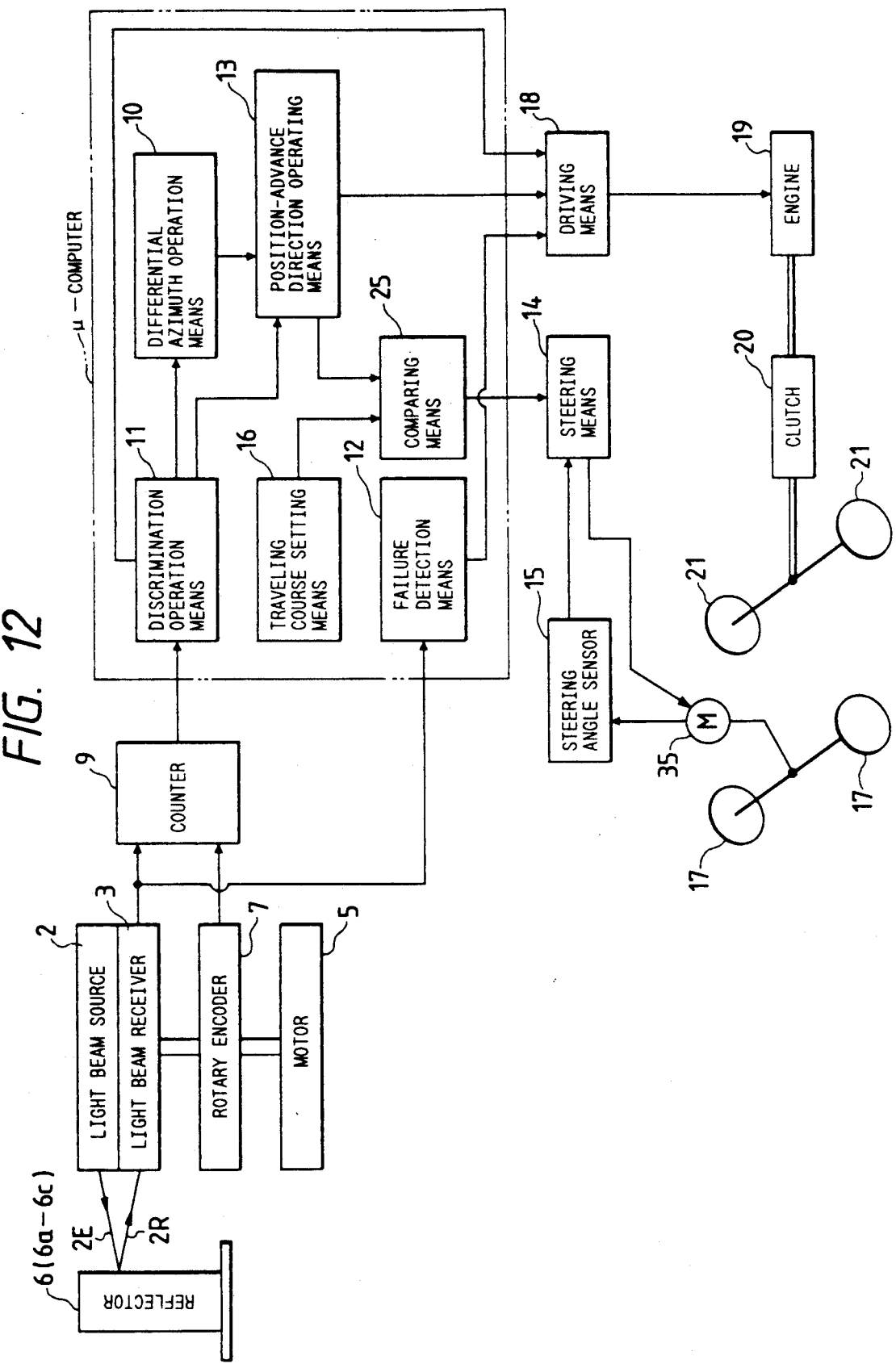
FIG. 12 is a block diagram showing another embodiment of the present invention.
Figure 13:
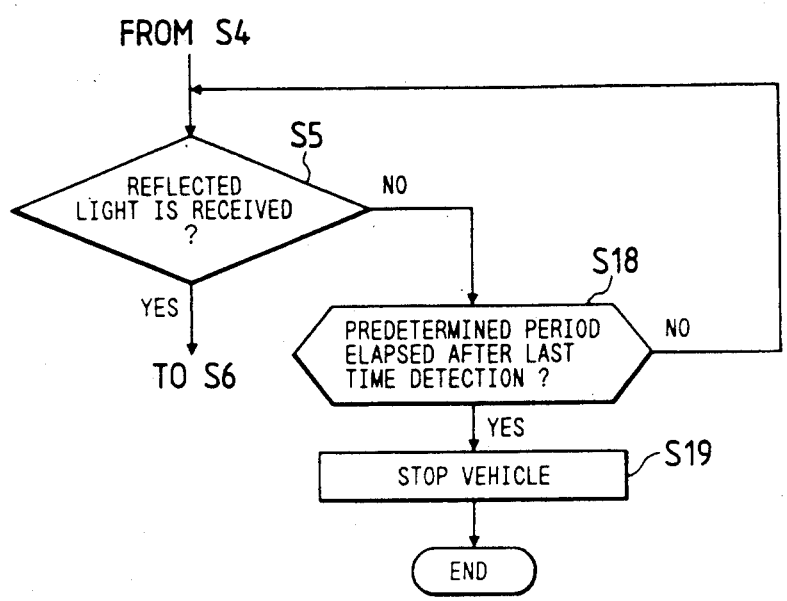
FIG. 13 is a part of a flowchart showing an operation of the embodiment in FIG. 12.
Figure 14:
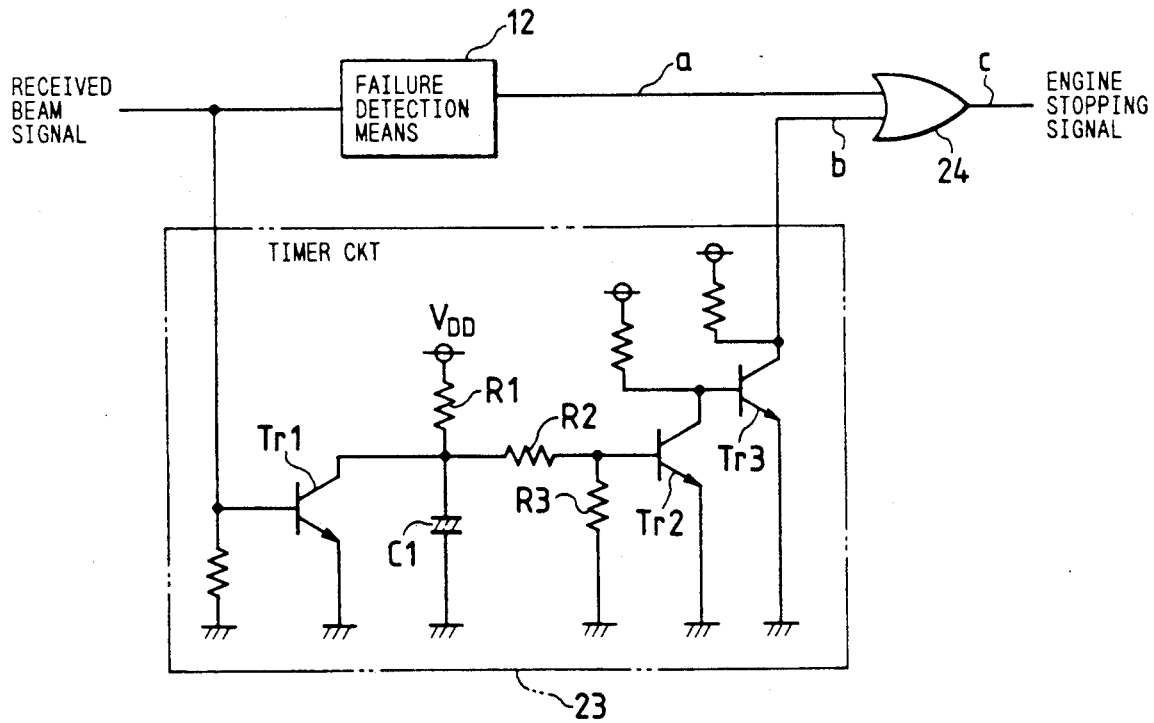
FIG. 14 is a circuit diagram showing a fail detecting means provided together with a backup circuit.

While the present embodiment has been described in such that the missing processing is carried out, or the moving vehicle 1 is stopped in the case when one or more reference points have been lost by a prescribed number of times, it may be arranged that the moving vehicle 1 is stopped or a missing processing is carried out by request as mentioned hereunder by referring to FIGS. 12–14 in the case where the reference points have been lost by a prescribed period of time, or the case where reference points are lost during a period for traveling the moving vehicle 1 by a prescribed distance.

Furthermore, although the present embodiment is so constructed that when the light reflected by a particular reflector is not received so that the reference point was lost, an azimuth of the reference point lost is presumed on the basis of the azimuths which have been obtained by detecting beam signals received in the last and the before-last detection cycles, respectively, and the position and the advance direction of the moving vehicle are calculated in accordance with the presumed reference point, it may be so constructed that the azimuth is presumed, thereafter the calculation for the position and the advance direction of the moving vehicle 1 in this cycle is cancelled, and travel of the vehicle is continued in the same advance direction as in the last cycle without any modification.

While the moving vehicle 1 has been adapted, in the present embodiment, to be driven by radio control or the like from a returning position R to a starting position for working, it may be so constructed that the light beam is scanned while the moving vehicle 1 stays at the returning position R to detect the azimuths of the reference points, and a traveling course extending from the returning position R to the starting position for working is operated on the basis of the detected azimuths, whereby the moving vehicle 1 is allowed to travel to the starting position for working along the operated traveling course. In this case, it is preferable to perform the discrimination process of the reference points during traveling from the returning position to the starting position for working.

FIG. 12 is a block diagram showing the second embodiment of the present invention wherein the same reference characters designate the same or corresponding parts as in FIG. 1, so that the explanation on such parts is omitted. In the second embodiment, when a following beam signal is not detected for a predetermined period of time after a preceding beam signal has been detected from one of a plurality of reference points, travel of a moving vehicle is stopped.

A beam signal received by a beam receiver 3 is inputted to a failure detecting means 12. When the following detection signal is not inputted after the lapse of a predetermined period of time after the input of the beam signal received in the last detection cycle, a command for stopping travel (stopping an engine 19 or disconnecting a clutch 20) of a moving vehicle is issued to a driving means 18.

The failure detecting means 12 is provided with a counter (not shown) for counting a clock signal of a predetermined cycle and which begins to count the clock signal in synchronism with a beam signal being inputted from the beam receiver 3, and which outputs a count-up signal when the following beam signal received is not inputted until a count value reaches the predetermined value. The count-up signal is inputted to the driving means 18 which outputs an engine stopping signal or a clutch disconnecting signal in response to the count-up signal.

It should be noted that when the following beam signal is inputted to the failure detecting means 12 before counting the predetermined value, a count value in the counter is cleared.

On the other hand, the lapse of the predetermined period of time may be also detected based on a travel distance of the moving vehicle 1. More specifically, a distance which can be traveled by the moving vehicle 1 within a predetermined period of time has been preset, and the time when travel of the predetermined travel distance is finished may be considered to be the time at which the predetermined period of time elapses.

Accordingly, in the case where a judgment whether or not a command for stopping the engine or disconnecting the clutch of the moving vehicle 1 should be issued is made in accordance with the travel distance, there is provided a means for detecting the predetermined travel distance by the same signal as that inputted to a conventional distance recorder which is, for example, provided for a standard for judging a time at which maintenance of a moving vehicle is required, and the failure detecting means 12 may be so constructed that an engine stopping signal or a clutch disconnecting signal is output at the time when the following beam signal has not been inputted during traveling by the predetermined travel distance.

The failure detecting means 12 is sufficient for providing either a judging means by the lapse of a period of time, or a judging means by the travel distance, but it is cope with a trouble in either means by the other means.

The discrimination processing means 11 has a function to discriminate light-reflectors 6 and effect missing processing thereof on the basis of the azimuths as fully described in conjunction with FIG. 1 in addition to the detection function of the azimuths. In the second embodiment, however, the discriminating and missing processing functions for the light-reflectors are not necessarily required, but may be omitted. Control in the second embodiment is attained by modifying a part of the step S5 in the flowchart shown in FIG. 3 as shown in FIG. 13.

In FIG. 13, it is judged in the step S5 whether or not the light reflected from a reference point is received by the beam receiver 3. When the reflected light is not received, the operation proceeds to the step S18 and wherein it is judged whether or not a predetermined period of time has elapsed after the detection of the beam signal at the last time. The lapse of time is judged by a count value in the counter or a detect value in a travel distance detecting means.

When the elapsed period of time does not reach the predetermined time, a processing in the step S5 is repeated until the reflected light is detected. When the reflected light is detected, the operation proceeds to the step S6.

When a beam signal is not detected in spite of the lapse of the predetermined period of time, it is judged that there are troubles in the beam receiver 3 or the rotating table 4 for the beam receiver 3 and the like, or there arises a tilting-over and the like of the beam reflectors, so that the operation shifts to the step S19 wherein a moving vehicle stopping command (engine stopping or clutch disconnecting command) is output to the driving means 18 thereby stopping the moving vehicle 1.

Functions of the failure detecting means 12 can be realized by microcomputer control as mentioned above. However, when a backup circuit of the hardware construction which will be described hereunder is provided in addition to the software processing, more positive failure detection and protection can be ensured.

FIG. 14 shows an example in which a backup circuit is jointly installed with the failure detecting means wherein an engine stopping command signal "a" which is output from the failure detecting means 12 and a signal "b" which is output from a timer circuit 23 after a lapse of a predetermined period of time in the timer circuit 23 are inputted to an OR circuit 24. When the signal "a" or "b" is inputted to the OR circuit 24, an engine stopping signal "c" is output from the OR circuit 24 to the driving circuit 18.

The beam signal output from the beam receiver 3 is inputted to the failure detecting means 12 and the timer circuit 23. When the beam signal is inputted to the timer circuit 23, a transistor Tr1 becomes conductive and a capacitor C1 is allowed to be discharged. If the beam signal is not inputted to the timer circuit 23 over a lapse of time which has been set by means of values of the capacitor C1 C1 elevates to conduct a transistor Tr2 thereby to interrupt a transistor Tr3.

As a result, the signal "b" inputted from the timer circuit 23 to the OR circuit 24 changes from low "L" into high "H" so that the engine stopping signal "c" is output from the OR circuit 24, while the transistor Tr3 is kept conductive and the input signal "b" in the OR circuit 24 is low "L" during a period wherein the beam signal is frequently inputted.

As described above, the second embodiment of the present invention is so constructed that if the beam signal from the beam receiver 3 is not inputted to the failure detecting means 12 over a predetermined period of time, the engine is allowed to stop thereby ceasing travel of the moving vehicle 1. Thus, even if the beam signal cannot be detected by the beam receiver 3, there is not such a case where the moving vehicle 1 deviates from a prescribed course.

In the second embodiment, when a reference point is missed, the azimuth of the missed reference point is presumed by the function of processing for missing reference points in the discrimination processing means 11, and the position of the moving vehicle 1 is calculated on the basis of the presumed value to effect the steering control. Since the moving vehicle 1 is subjected to steering control based on the presumed value during a period of time which does not exceed a predetermined value set in the failure detecting means 12, the moving vehicle 1 does not significantly deviate from the predetermined traveling course. And the moving vehicle 1 can be allowed to stop before untolerable expansion of a difference between an actual value and a calculated value in the current position of the moving vehicle 1.

Moreover, when the backup circuit is provided in addition to the failure detecting means 12 in the second embodiment, the moving vehicle 1 can be allowed to stop more positively to cope With an accident. The backup circuit is not necessarily used together with the failure detecting means, but it may be used alone, too.

As is apparent from the above description, the following technical advantages can be attained in accordance with the present invention.

(1) Even if one or more reference point are temporarily lost, the moving vehicle can be allowed to travel continuously, while the moving vehicle is stopped in only the case where these reference points are frequently lost. Accordingly, there is no useless interruption of working so that its working efficiency is improved.

(2) Since there is no such erroneous judgment the light derived from something other than reference points is taken as the light reflected by the reference points, it is not required that reflective objects or luminous objects be removed from the working area as well as the neighborhood thereof prior to working.

(3) The moving vehicle can continuously travel, even if one or more reference points are temporarily lost. Accordingly, the moving vehicle can be allowed to work in a working area under such a bad condition where the moving vehicle somewhat rolls, so that an applicable range of the moving vehicle can be expanded.

(4) When no beam signal is detected for a prescribed period of time during unmanned steering of the moving vehicle, travel of the moving vehicle can be stopped. Accordingly, even if there are troubles in a photosensor system such as the beam receiving means and the rotating means for the photosensor system as well as there arises tilting-over of reflecting means, unstable traveling of the moving vehicle for a long period of time while detecting no current position thereof can be prevented from occurring.

What is claimed is:

1. A steering control system for a moving vehicle wherein a light beam emitted form the moving vehicle is scanned around an axis on the moving vehicle along the circumferential direction thereof, and the light beam is reflected by light-reflecting means disposed at at least three reference points around a working area in which said vehicle is moving, the reflected light being received at said axis on the vehicle to detect a position of the moving vehicle, said system comprising:

azimuth detection means for detecting the azimuths of the respective light-reflecting means with respect to an advance direction of the moving vehicle on the basis of a beam receiving interval of the light reflected by the light-reflecting means;

azimuth prediction means for predicting an azimuth of each light-reflecting means to be detected in a next scanning cycle based on the azimuth detected by the azimuth detection means during a given scanning cycle;

position calculation means for calculating the position of the moving vehicle based on the detected azimuths;

said position calculation means being operative to calculate the position of the moving vehicle based on a detected azimuth only when the detected azimuth of a light-reflecting means is in the azimuth predicted in the azimuth prediction means;

azimuth presumption means for presuming the azimuth of a light-reflecting means which is not detected when the light-reflecting means is not detected in the predicted azimuth; and means for stopping travel of the moving vehicle when a following beam signal has not been detected over a predetermined period of time after detecting a preceding beam signal from a particular light reflecting means.

2. The steering control system for the moving vehicle as claimed in claim 1 wherein a lapse of the predetermined period of time is detected by means of a count value of clock signal in a counter.

3. The steering control system for the moving vehicle as claimed in claim 1 wherein a lapse of the predetermined period of time is detected by means of a predetermined travel distance of the moving vehicle.

4. The steering control system for the moving vehicle as claimed in claim 1 wherein a lapse of the predetermined period of time is detected by a timer circuit including a time constant circuit composed of a resistor and a capacitor.

5. The position-detecting system for the moving vehicle as claimed in claim 1 wherein the predicted azimuth has a predetermined range which is set on the basis of at least one azimuth which has been detected lastly.

6. The position-detecting system for the moving vehicle as claimed in claim 1 wherein a single light beam is scanned around the moving vehicle in one direction, and said reference points are detected in fixed order.

7. A position-detecting system for a moving vehicle wherein a single light beam emitted from the moving vehicle is scanned around an axis on the moving vehicle along the circumferential direction thereof, and the light beam is reflected in a fixed order by light-reflecting means disposed at at least three spaced reference points around a working area in which said vehicle is moving, the reflected light being received at said axis on the vehicle to detect a position of the moving vehicle, said system comprising:

azimuth detection means for detecting azimuths of the respective light-reflecting means with respect to an advance direction of the moving vehicle on the basis of a beam receiving interval of the light reflected by the light-reflecting means;

azimuth prediction means for predicting an azimuth of the light-reflecting means to be detected in the next scanning cycle based on the azimuth detected by the azimuth detection means;

position calculation means for calculating the position of the moving vehicle based on a detected azimuth when the detected azimuth of the light-reflecting means is in the azimuth predicted in the azimuth prediction means; and azimuth presumption means for presuming the azimuth of a light-reflecting means which is not detected when the light-reflecting means is not detected in the predicted azimuth.

8. The position-detecting system for the moving vehicle as claimed in claim 7 further comprising means for stopping the moving vehicle when no detection of the light-reflecting means in the predicted azimuth continuously occurs a prescribed number of times.

9. The position-detecting system for the moving vehicle as claimed in claim 7 further comprising first counting means for counting the number of first successive detection cycles in which a particular light-reflecting means has not been detected in a predicted azimuth therefor;

setting means for setting a first prescribed number of times; and means for stopping the moving vehicle when the number of first successive detection cycles exceeds the first prescribed number of times.

10. The position-detecting system for the moving vehicle as claimed in claim 9 further comprising second counting means for counting the number of second successive detection cycles in which a plurality of light-reflecting expected to be serially detected have not been detected serially in the respective predicted azimuthes therefor;

setting means for setting a second prescribed number of times; and means for stopping the moving vehicle when the number of second successive detection cycles exceeds the second prescribed number of times.

11. The position-detecting system for the moving vehicle as claimed in claim 10 wherein the first prescribed number of times is larger than the second prescribed number of times.

12. The position-detecting system for the moving vehicle as claimed in claim 7 wherein the predicted azimuth has a predetermined range which is set on the basis of at least one azimuth which has been detected lastly.

13. The position-detecting system for the moving vehicle as claimed in claim 7 further comprising a counting means for counting the number of successive detection cycles in which a plurality of light-reflecting expected to be serially detected have not been detected serially in the respective predicted azimuthes therefor;

setting means for setting a prescribed number of times; and means for stopping the moving vehicle when said number of successive detection cycles exceeds said prescribed number of times.

14. A position-detecting system for a moving vehicle wherein a light beam emitted from the moving vehicle is scanned around the moving vehicle along the circumferential direction thereof, and the light beam reflected by light-reflecting means disposed at at least three reference points is received to detect a position of the moving vehicle comprising:

azimuth detection means for detecting azimuths of the respective light-reflecting means with respect to an advance direction of the moving vehicle on the basis of a beam receiving interval of the light reflected by the light-reflecting means;

azimuth prediction means for predicting an azimuth of the light-reflecting means to be detected in the next scanning cycle based on the azimuth having been detected by the azimuth detection means; and a means for stopping the moving vehicle when no detection of the light-reflecting means in the predicted azimuth continuously, occurs a prescribed number of times.

* * * * *